C. W. MITCHELL.
ROTARY GAS ENGINE.
APPLICATION FILED MAY 5, 1909.
1,165,988.
Patented Dec. 28, 1915.
6 SHEETS—SHEET 5.
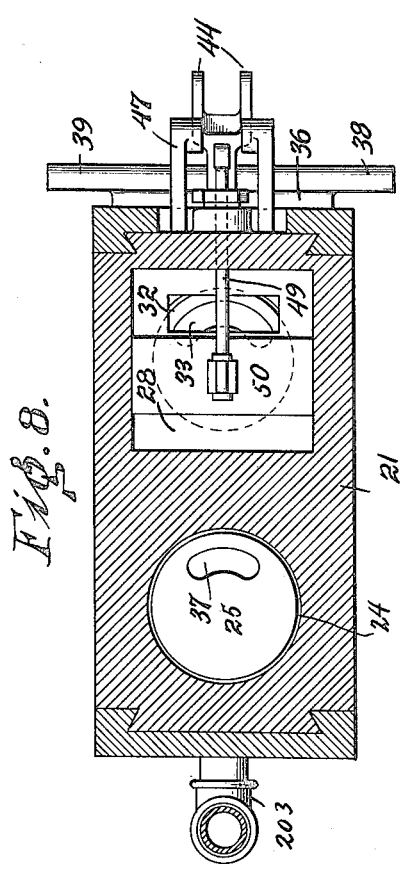
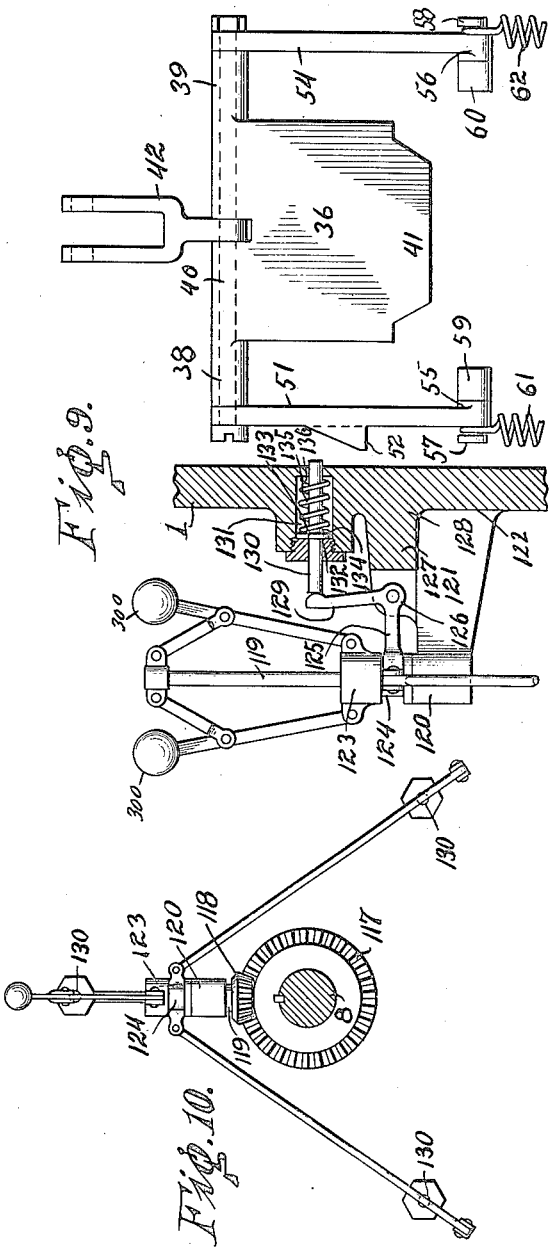
WITNESSES
INVENTOR
Charles W. Mitchell
BY
ATTORNEY

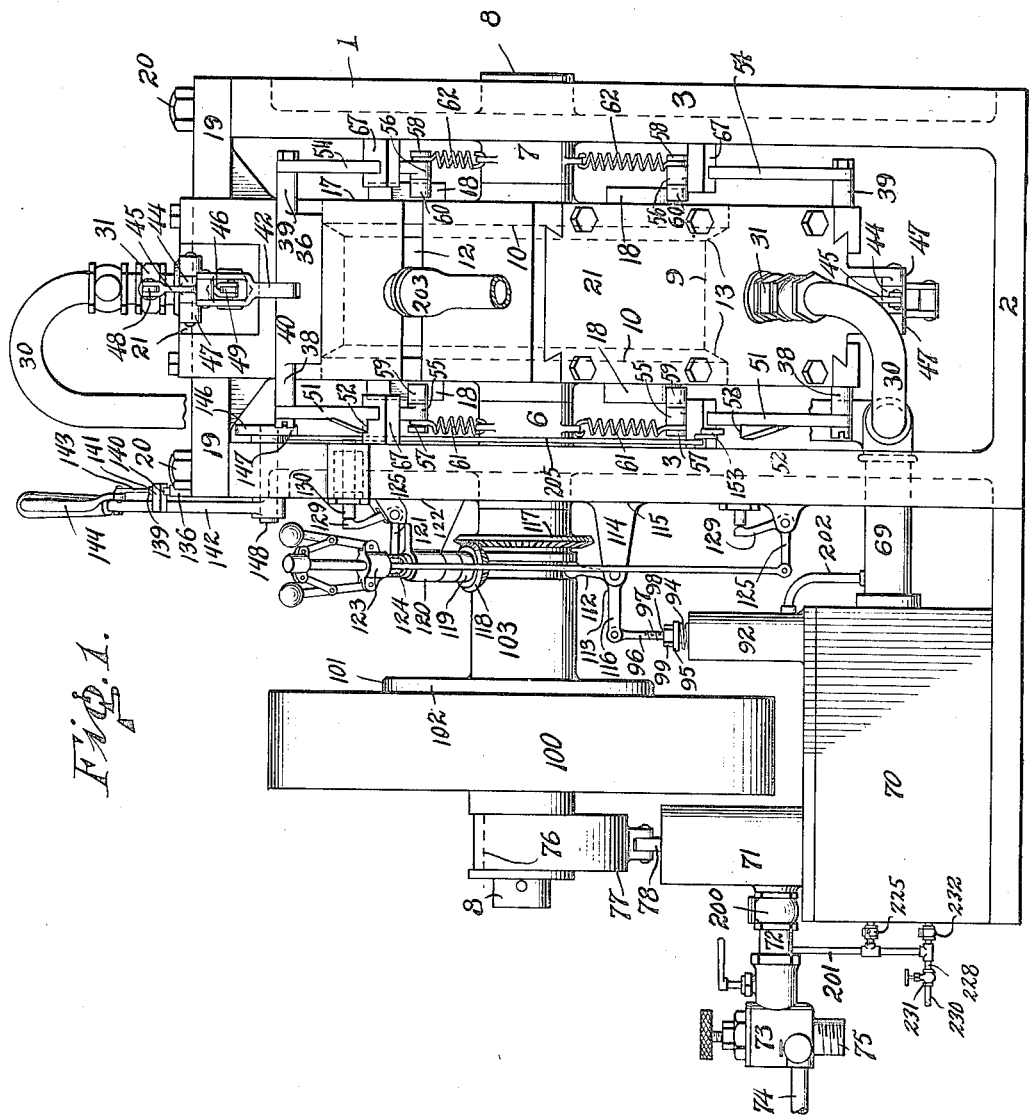

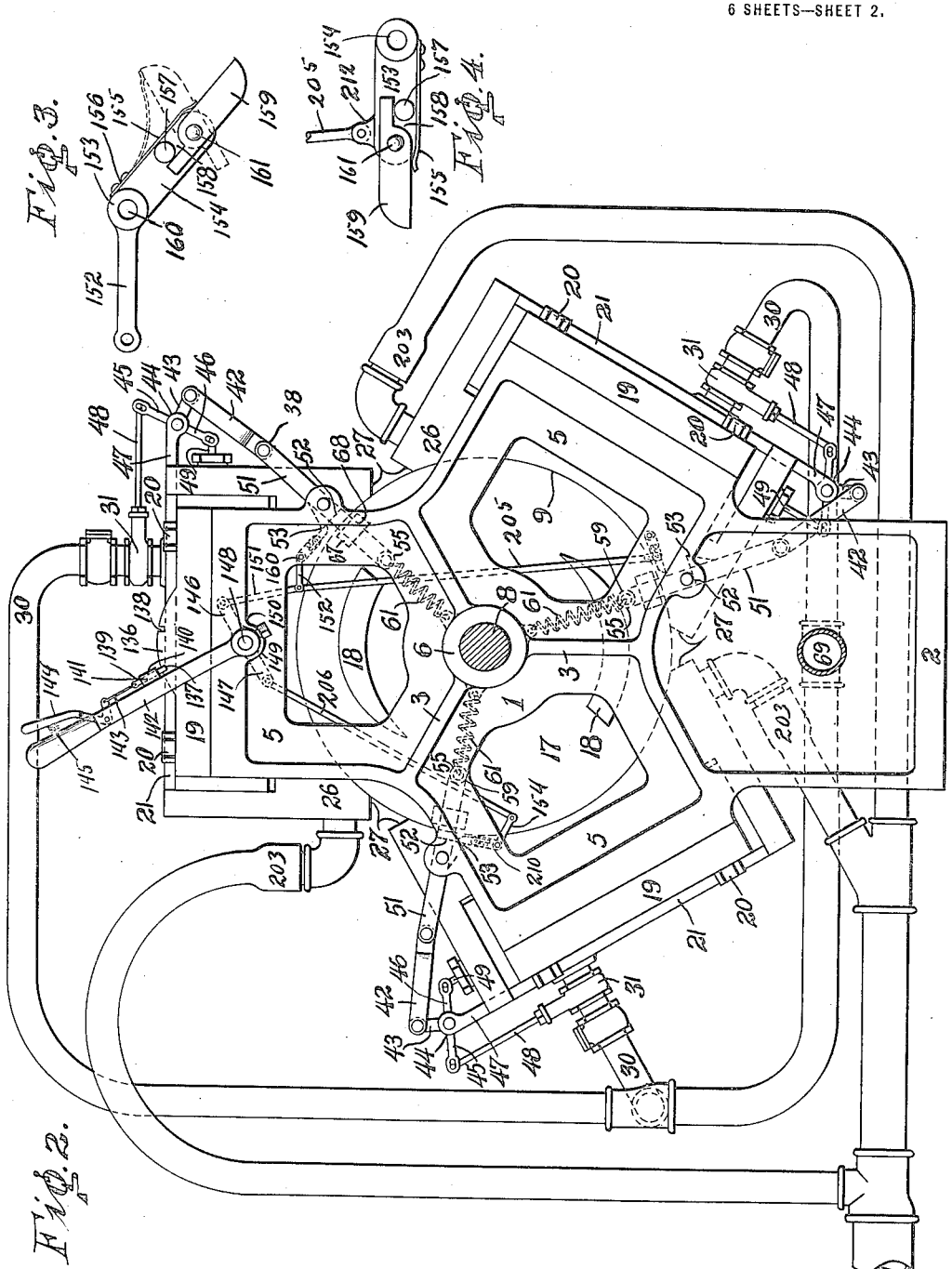

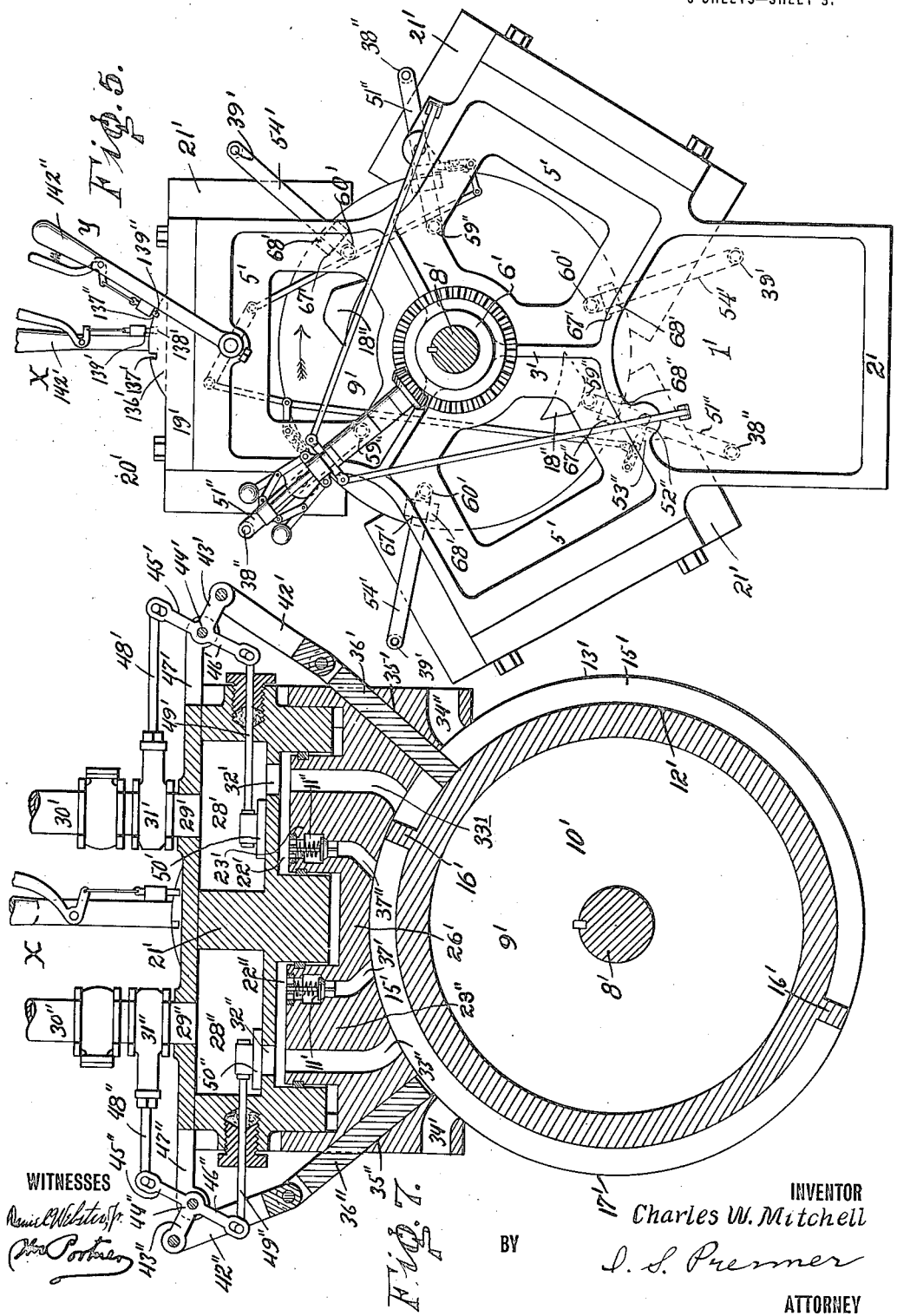

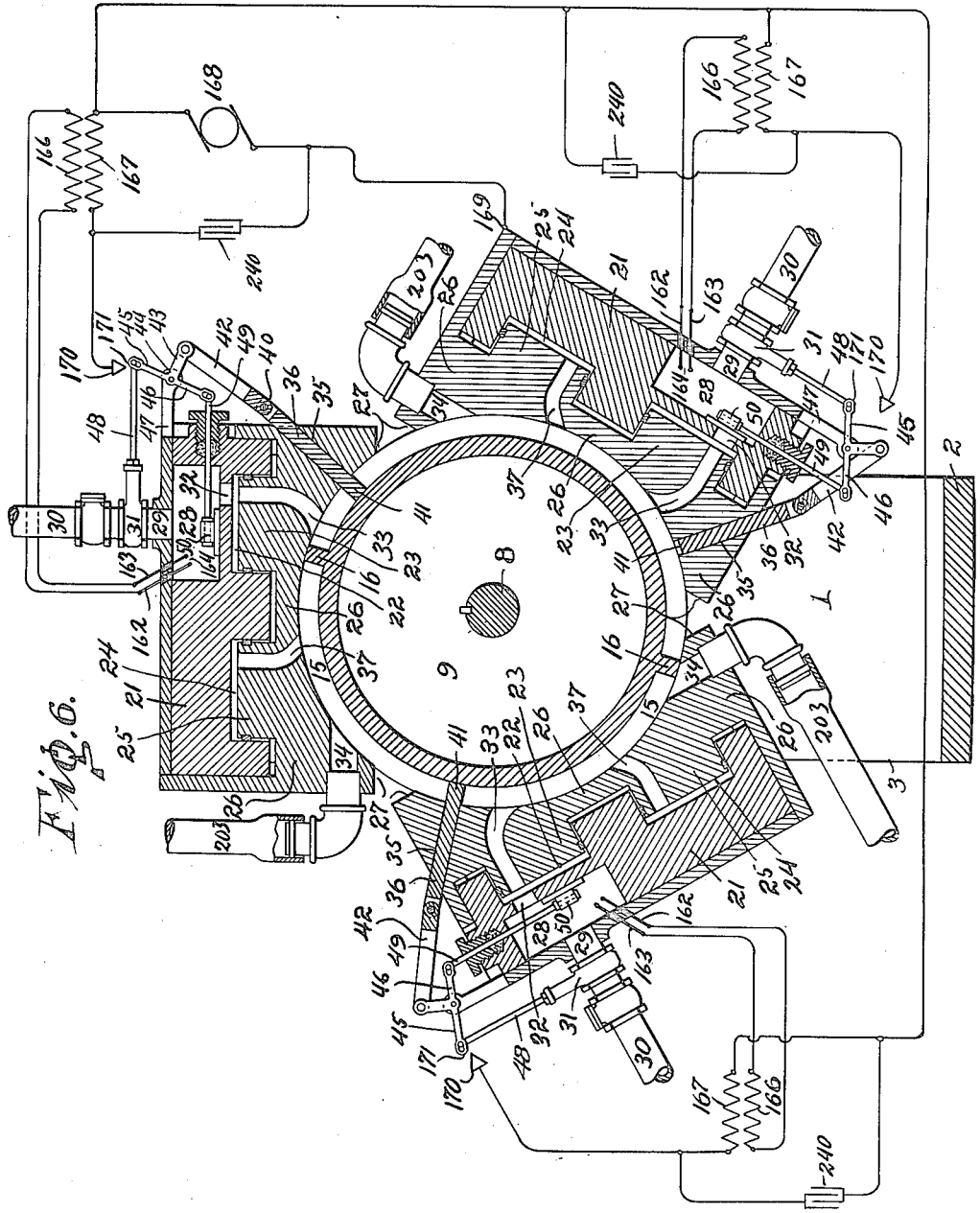

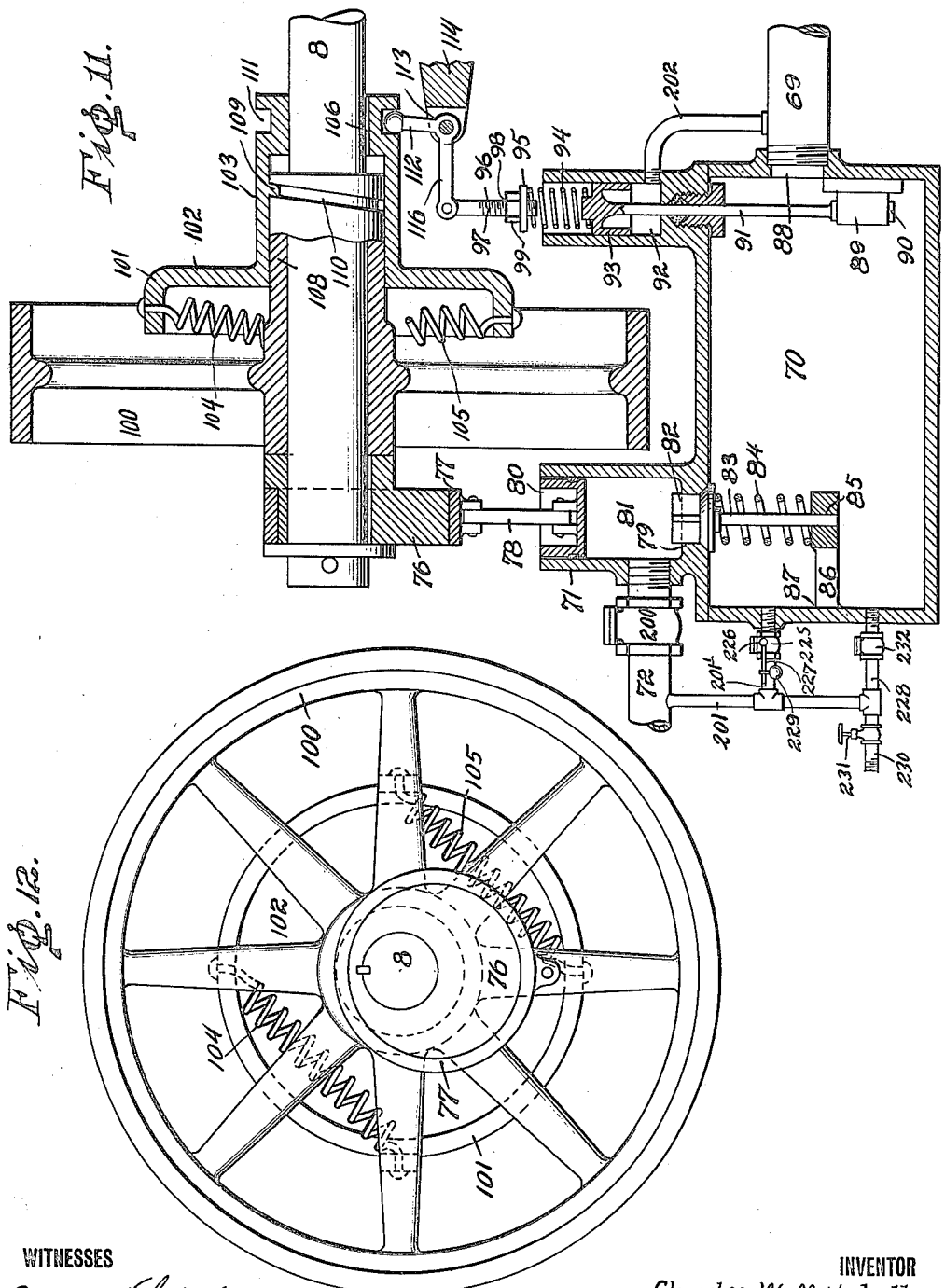

UNITED STATES PATENT OFFICE.

CHARLES W. MITCHELL, OF PHILADELPHIA, PENNSYLVANIA, ASSIGNOR OF ONE-THIRD TO LIZZIE A. MITCHELL AND ONE-THIRD TO ALEXANDER W. MORROW, OF PHILADELPHIA, PENNSYLVANIA.

ROTARY GAS-ENGINE.

1,165,988.   Specification of Letters Patent.   Patented Dec. 28, 1915.

Application filed May 5, 1909. Serial No. 494,078.

*To all whom it may concern:*

Be it known that I, CHARLES W. MITCHELL, a citizen of the United States, residing in Philadelphia, in the county of Philadelphia and State of Pennsylvania, have invented certain new and useful Improvements in Rotary Gas-Engines, of which the following is a specification.

My invention relates to engines wherein power is developed by a gas which is caused to explode in a chamber of a stationary box to produce impulses on a piston wheel or rotor, to cause a continuous rotation of the rotor, and the object thereof is, first to produce a rotary piston for a fluid engine, second—to cause a piston to rotate by impulses produced by a series of explosions, third—a stationary explosion chamber, fourth—a shoe for producing gas-tight contact between the chamber and the piston, fifth—to cause the exploded gas to produce the greatest possible effect on the piston, sixth—to cause the exploded gas to prevent leakage, seventh—to discharge the exploded mixture after its impulsive effect is spent, eighth—to govern the explosions for the purpose of producing a uniform speed, ninth—to vary the supply of the exploding mixture with the variation of the speed, tenth—to produce a constant speed under a variable load, eleventh—to produce a self-starting engine, and twelfth—to produce a reversible engine.

With these and other objects in view, this invention consists in the combination, construction, and the arrangement of parts as will be hereinafter more fully described and claimed, and illustrated in the accompanying drawings, it being understood that changes in form, size, shape, and minor details may be within the scope of the claims, without departing from the spirit or sacrificing any of the advantages of this invention.

In the accompanying drawings, Figure 1, is a front elevation partly in perspective; Fig. 2, is a side elevation thereof; Fig. 3, is a detail in connection with a starting device shown in Fig. 2; Fig. 4, is a modification thereof; Fig. 5, is an obverse side elevation showing the necessary attachments for making the engine reversible; Fig. 6, is a cross section of a non-reversible engine; Fig. 7, is a cross section of a reversible engine; Fig. 8, is a plan view of a box in connection with Fig. 6; Fig. 9, is a front elevation of a centrifugal governor in connection with the engine; Fig. 10, is a side elevation thereof; Fig. 11, is a front elevation of a torque governor in connection with the engine, and Fig. 12, is a side elevation thereof.

Similar figures refer to similar parts throughout the several views.

A frame-work 1, consists of a base 2, pedestals 3, and webs 5. The pedestals 3, are provided with journal-boxes 6 and 7, for a shaft 8, on which is fixedly mounted a piston-wheel or rotor 9, consisting of disks 10, a cylindrical surface 12, of a smaller diameter than those of the disks, which are tapered as at 13, to form a peripheral groove 15. In the groove 15, are mounted vanes 16, and on the side faces 17, of the disks 10, are mounted cams 18.

The webs 5, of frame 1, are joined by plates 19, bolted thereto as at 20. From the plates 19 are extended valve-boxes 21, joining the webs 5, and are provided with cylinders 22, for pistons 23, and with cylinders 24, for pistons 25, of shoes 26, spanning the piston 9, as at 27. The valve-boxes 21, are provided with chambers 28, immediately over the cylinders 22, and have ports 29, over which are tapped pipes 30, provided with valves 31, and ports 32, which connect the chambers 28, with the cylinders 22. Discharge orifices 33, through the pistons 23, and immediately under the ports 32, connect the cylinders 22, with the piston groove 15. Auxiliary orifices 37, in the pistons 25, connect the cylinders 24, with the piston groove 15.

The shoes 26, are provided with exhausts 34, and with slide-channels 35, for slides 36. The slides 36, are provided with arms 38 and 39, on their tops 40, and have vanes 41, shaped to fit the groove 15, of piston 9. To the tops 40, of the slides 36, are pivoted bars 42, which are also pivoted on legs 43, of levers 44, pivoted on brackets 47, which are provided with arms 45 and 46. On the arms 45, are pivoted rods 48, connected with the pipe-valves 31, and on the arms 46, are pivoted rods 49, connected with the valves 50, for the ports 32. On the arms 38, of the slides 36, are bolted bars 51, provided with noses 52 and 53, and on arms 39, of the non-reversible engine, are mounted bars 54. The bars 51, are provided with sockets 55, for bolts 57, on which are revolubly mounted collars 59. The bars 54, are similarly provided with sockets 56, for bolts 58, on which are revolubly mounted collars 60. Coiled-springs 61 and 62, connect the bars 51 and 54, with the journal-boxes 6 and 7 respectively. Brackets 67, provided with guides 68, for the bars 51 and 54, are attached to frame 1.

The pipes 30, tapped over the ports 29, branch out of a main 69, tapped on to a reservoir 70, which is supplied with an explosive mixture by a pump 71, connected through a pipe 72, with a carbureter 73, wherein the explosive mixture is formed from air supplied by a pipe 74, and from gas supplied by a pipe 75.

The pump 71, is operated from an eccentric 76, mounted on shaft 8, and is free to revolve in a ring 77, on whose periphery is pivoted a piston rod 78, which is also pivoted on a piston 80, of the cylinder 81. The cylinder 81, is connected with the reservoir 70, through a port 79, controlled by a valve 82, fixed on a rod 83, passing through a coiled-spring 84, and slidingly mounted in a guide 85, of a bracket 86, within the reservoir 70, at 87.

Reservoir 70, is connected with the main 69, through a port 88, controlled by a valve 89, fixed on one end 90, of a rod 91, which passes through the reservoir 70, into a cylinder 92, where it is connected to a piston 93, connected with one end of a coiled-spring 94, whose other end is connected to a disk 95, slidingly mounted over a rod 96, provided with a worm 97, to mesh with the inside worm 98, of a hand-wheel 99, mounted over the disk 95.

A wheel 100, is revolubly mounted on shaft 8, and is connected with a ring 101, of a disk 102, of a collar 103, by means of coiled-springs 104 and 105. The collar 103, is slidingly mounted on a key 106, in the shaft 8, and on the hub 108, of the wheel 100, and is provided with a tooth 109, to move in groove 110, running slantingly from right to left around the hub 108. The collar 103, has a groove 111, on its cylindrical surface, for rockingly supporting an arm 112, of a lever 113, pivoted on a bracket 114, attached to the frame 1, at 115, which has also an arm 116, pivoted on the rod 96. On the shaft 8, is also mounted a bevel-gear 117, meshing with a bevel-gear 118, fixedly mounted on a spindle 119, revolubly supported in a bearing 120, of a bracket 121, attached to the frame 1, at 122. Over the spindle 119, is mounted a collar 123, provided with a groove 124, wherein is movably pivoted an arm 125, of a lever 126, pivoted on a bracket 127, attached to the frame 1, at 128. An arm 129, of the lever 126, is free to rock in front of a plunger 130, of a socket 131, in frame 1, at 132. In the socket 131, and over the plunger 130, is fixedly mounted a disk 133, and a coiled-spring 135.

On the top 19, of the frame 1, is mounted a lug 136, provided with notches 137 and 138, for a plunger 139, slidingly mounted in a bearing 140, of a bracket 141, attached to a lever 142, and suspended by a link 143, from a handle 144, pivoted on the lever 142, and further connected therewith by a coiled-spring 145. The lever 142, is provided with arms 146, 147, and is mounted on a pin 148, pivoted in a socket 149, of the frame 1, at 150. The arm 146, is pivoted on a rod 151, on which is also pivoted an arm 152, of a lever 153, pivoted on web 5, at 160, and having an arm 154, provided with a strip of spring steel 155, at 156, and has a pin 157, for a recess 158, of a lip 159, pivoted on the arm 154, at 161.

Passing through the boxes 21, and within the explosion chambers 28, are terminals 162 and 163, separated by an arcing space 164, of a secondary coil 166, of a transformer whose primary coil 167, is connected through an electric generator 168, having a grounded terminal 169, and terminals 170, for making and breaking a circuit at 171. To prevent any damage to the circuit by the back pressure produced when the circuit is suddenly broken condensers 240, are connected across the circuit.

In Figs. 5 and 7, are shown the necessary modifications to make the engine reversible, as will appear from the following description. A frame 1', consists of a base 2', pedestals 3', and webs 5'. The pedestals 3', are provided with journal boxes 6', for a shaft 8', on which is fixedly mounted a rotor 9', consisting of disks 10', a cylindrical surface 12', which is of a smaller diameter than those of the disks, which are beveled as at 13', to form a groove 15'. In the groove 15', are fixedly mounted vanes 16', and on the side faces 17', of the disks 10', are mounted cams 18'. The webs 5', of frame 1', are joined by plates 19', and extending therefrom are valve-boxes 21', joining the webs 5', only one of which is shown in cross section in Fig. 7, which are provided with cylinders 22', for pistons 23', and with cylinders 22'', for pistons 23'', of shoes 26', spanning the rotor 9'. The valve boxes 21', are provided with explosion chambers 28', immediately over the cylinders 22', and have ports 29', over which are tapped gas-pipes 30', provided with valves 31', and ports 32', which connect the chambers 28', with the cylinders 22'. Discharge orifices 33', through the pistons 23', and immediately under the ports 32', connect the cylinders 22', with the rotor groove 15'. Auxiliary orifices 37'', also connect the cylinders 22', with the groove 15', and are controlled by valves 11″. The valve boxes 21′, are also provided with explosion chambers 28″, cylinders 22″, ports 29″, under the pipes 30″, valves 31″, ports 32″, discharge orifices 33″ through channels 23″ and auxiliary channels 37′ controlled by valves 11′. The shoes 26′, are provided with exhausts 34″, and with slide channels 35′, and also with exhaust 34′ and slide channels 35″. A slide 36′, guided in the channel 35′, is pivoted on a bar 42′, which is pivoted on a leg 43′, of a lever 44′, pivoted on a bracket 47′. The lever 44′, has an arm 45′, on which is pivoted a rod 48′, connected to valve 31′, and an arm 46′, pivoted on a rod 49′, connected to valve 50′. A similar slide 36″, guided in channel 35″, is pivoted on a bar 42″, pivoted on a leg 43″, of a lever 44″, pivoted on a bracket 47″. The lever 44″, has an arm 45″, on which is pivoted a rod 48″, connected with the valve 31″, and an arm 46″, pivoted on a rod 49″, connected to valve 50″. The slides 36′, are provided with arms 39′ carrying bars 54′, passing through guides 68′, of brackets 67′, and carry rollers 60′, to permit cams 18″ to pass under them. The slides 36″, are similarly provided with arms 38″, carrying bars 51″, passing through guides 68″, of brackets 67′, and carry rollers 59″, for the cams 18″, to pass under them. The arms 38″, are provided with noses 52″ and 53″.

Except as described above, the reversible engine is, in every other respect, similar to the non-reversible engine, except that it is provided with two starting devices, designated by X and Y respectively, for starting the engine in any one of two directions, by throwing one of said devices to the off position before the other is thrown to the on position. Thus in Fig. 5, starting device X, is shown in the off position and Y in the on position, for causing the piston to revolve in the direction of the arrow. To reverse the direction, Y must first be thrown to the position parallel with X, after which X is first thrown to the right and then immediately to the extreme left.

In describing the operation of this gas engine, I assume an explosive mixture formed in carbureter 73, from air and gas flowing therein through pipes 74 and 75, forced by the pump 71, in the reservoir 70, thence through the pipe 69, into pipes 30, and chambers 28, where it is exploded by a spark in the arcing space 164, and the exploded mixture is forced through the discharge orifices 33, striking the vanes 16, which causes rotor 9, to revolve with the shaft 8. The eccentric 76, fixedly mounted on the shaft 8, revolves in ring 77, and produces a reciprocating motion in piston rod 78, on which piston 80, is pivoted, which is caused to move up and down in cylinder 81, of pump 71. When piston 80 moves up, the explosive mixture flows into the cylinder 81, of pump 71, from carbureter 73, by opening valve 200. When the piston 80, moves down, the mixture is forced into the reservoir 70, through port 79, as valve 82, is forced out of the port by the downward pressure of the mixture, at the same time closing valve 200. On the up stroke of piston 80, the valve 82, closes the port 79, by the spring 84. The reservoir is thus filled with a mixture at a given pressure which is regulated by a pipe 201, forming a by-path for any surplus. When port 88, of reservoir 70, is opened by spring 94, forcing the piston 93 down, thereby forcing down the valve 89, connected therewith by rod 91, the mixture continues to flow through the port 88, in pipe 69, part of it flowing through elbow 202, in cylinder 92, until the pressure of the mixture overcomes that of the spring 94, when piston 93, is forced up, causing rod 91, to pull up valve 89, and closing port 88. The mixture continues to flow through pipe 69, distributing itself through pipes 30, leading out of pipe 69, whose number depends upon the number of boxes around the rotor 9. As the piston wheel 9, revolves, the cams 18, mounted on the face 17, pass under the rollers 59, mounted on pins 55, of bars 51, mounted on arms 38, of slides 36, which are caused to slide outwardly in shoe 26. This outward movement of slide 36, causes an upward movement of bar 42, pivoted thereon. This causes leg 43 of lever 44, to move upwardly, its arm 45, forcing the rod 48, to cause valve 31, of pipe 30, to open port 29, of chamber 28, while the arm 46, pulls on rod 49, for causing valve 50, to close port 32, and the mixture from pipe 30, flows in chamber 28. When the cam 18, and vane 16, pass slide 36, the spring 61, which connects arm 51, with journal box 6, of frame 1, causes slide 36, to move inwardly and the operation is reversed, valve 31, closing port 29, and valve 50, opening port 32. The vane 41, of slide 36, fits closely the groove 15, and the vane 16, is just past the discharge 33. The mixture thus becomes distributed through chamber 28, discharge 33, and the piston groove 15, between vane 41, of slide 36, and the vane 16. At the same time a circuit is made and broken at 171 causing a spark in the arcing space 164, which explodes the mixture and the pressure of the exploded mixture against vane 16 causes the rotor to revolve. A portion of the exploded mixture distributes itself over the piston 23, pressing the shoe against the rim of the wheel 9, to prevent leakage, and as vane 16, passes by auxiliary orifice 37, a portion flows through 37 and distributes itself over the piston 25, to hold the shoe down until vane 16 passes the exhaust 34 when it is exhausted through exhaust pipe 203.

When the engine is in operation the plunger 139 is in notch 137 of lug 136, and lip 159 is on a line with arm 154. To stop the engine the handle 144 is pressed against lever 142 lifting plunger 139 out of notch 137 when the lever can be thrown to the right until notch 138 is reached, when handle 144 is released causing plunger 139 to plunge in notch 138. As the lever 142 is thus swung, the arm 146 is moved downwardly, which causes rod 151 to move downward, causing arm 152 of lever 153 to move down and arm 154 to move up, which causes lip 159, to press on nose 53, of arm 51, to lift out slide 36, of groove 15, at the same time closing port 32, for preventing the mixture from flowing through the discharge 33. To start the engine, the plunger is removed from the notch 138, and moved farther to the right, which causes lip 159, to press against nose 53, causing lip 159, to swing on pin 161, until it slips out from under nose 53. When the lever 142, is thrown back to its operating position, spring 155, presses lip 159, down to its horizontal position, and slide 36, moves inwardly, causing lever 44, to rock. During this operation the mixture is exploded and the rotor receives an impulse, when the engine continues to operate as described above.

It should be noticed that the lines of contact between any one shoe as 26, the portion of the periphery it spans as 27—27 the slide as 36, and the groove 15 of the rotor 9, must be gas tight, and must not be displaced by the pressure produced by the explosion. This is accomplished with the aid of the pistons 23 and 25, and their orifices 33 and 37 by the downward pressure on the shoe caused by the exploded mixture. The wear between the rotor 9, and that of any one shoe 26 is taken up by the same pressure, and that of the groove 15, and the vane 41, of the slide 36, is taken care of by the springs 61 and 62.

To prevent the engine from racing, the centrifugal governor illustrated in Figs. 9 and 10, may be used to advantage. Any increase of the speed of the shaft 8, is transmitted to the spindle 119, of the governor, by the gears 118 and 123 to cause the governor balls 300 to fly outwardly by centrifugal force causing the lever 126, to rock forcing the plunger inwardly, to catch under the nose 52. This would prevent the slides from descending thereby preventing an explosion in the explosion chamber, which would result in a decrease of the speed. The decrease in the speed would cause the balls to collapse, and cause the plunger to release the slide, allowing its vane to drop in the groove which would result in firing the explosive mixture in the chamber.

A standard engine of this character, should preferably be provided with three boxes and with two vanes, which would result in one explosion following another, to cause the piston wheel or rotor to rotate by a constant pressure produced by the explosions, always having one of its vanes in a position to be acted upon by the exploded gas. In a two vane engine there would be two explosions per revolution, per explosion chamber which is all that could be taken care of by a high speed engine. Engines for very high speeds should preferably have only one vane, which would give one explosion per revolution per explosion chamber. Very large engines of moderate speed, could be provided with more than two vanes, and with more than three boxes. The number of boxes and vanes would depend upon the size and speed of the engine, but the construction, operation and control would be the same, except as to some minor changes in connecting up the governors and starting devices.

In Fig. 2, the operating lever 142, has an arm 146, on which is pivoted a rod 151, also pivoted on an arm 152, of a lever 153, for operating the slides of one of the boxes. For operating the slide of the next box, a bracket 212, as shown in Fig. 4, is substituted for the arm 152, and a rod 205, is pivoted between the rod 151, and the lever 153. For operating the third box, a rod 206, is pivoted on an arm 147, of operating lever 142, and the lever 154, is pivoted on the rod 206.

The reversible engine is preferably provided with two devices for starting and stopping, as seen in Fig. 5, which for the purpose of reference are designated by X and Y. An operating lever 142″, is shown inclined to the right, in which position it is held by a plunger 139″, in the right hand notch 137″, of the lug 136′, and the lever 142′, is held in a vertical position, by the plunger 139′, in the central notch 138′. This arrangement would allow the engine to revolve in the direction of the arrow. For reversing the direction, the lever 142″, is thrown to the vertical position, its plunger 139″, catching in the central notch 138′, which is the off position. The plunger 139′, is then released from the central notch, when lever 142′, is thrown to the right, for lifting the slides, and then to the left, until its plunger 139′, is in notch 137′, which releases the slides and causes the engine to start in the opposite direction.

For the purpose of regulating the speed, of the reversible engine, two centrifugal governors are preferably used, only one being shown in Fig. 5, where it is shown connected for regulating the speed when the engine is running in the direction of the arrow. A similar governor, similarly connected, may be assumed to be mounted on the obverse side for regulating the speed when the engine is running in the opposite direction.

The centrifugal governors are all alike, whether used in connection with the reversible, or with the non-reversible engines.

To provide for close speed regulation under a variable load, as would be the case in using the engines in connection with electric generators operated in parallel, or in operating a propeller of a boat, the torque governor, shown in Figs. 1, 11, and 12, could be advantageously used. Assuming the wheel 100, revolubly mounted on the shaft 8 to be belted or otherwise coupled on to some variable load, should there occur a sudden increase in the load, it would tend to check the speed of the wheel. The engine shaft 8 being free to revolve within the hub 108 of the wheel 100 would tend to continue at the speed it acquired before the check on the wheel, and would take along the collar 103, keyed thereon, causing its tooth 109 to slide forwardly in groove 110 of hub 108, inclined in the direction of the wheel. The collar 103 being free to slide along the shaft, would cause the arm 112, pivoted in groove 109 of the collar 103, to swing in the same direction, which would cause the arm 116 to swing downwardly, compressing the coiled spring 94, which would cause the piston 93 to move down in the cylinder 92 and the rod 91, connecting the piston 93 with the valve 89 would cause it to move down and to open the port 88, which would result in gas flowing through pipe 69 and pipes 30 to the explosion chamber 28. This would result in increasing the force of the explosions, resulting in an increase of the turning power of the shaft which would pull the collar 103 with it, and transmit the pull to the wheel 100, through the coiled spring 105, connecting the wheel 100 with the collar 103.

Should the load be thrown off the belt, the speed of the wheel 100 would increase. The wheel would therefore tend to run ahead of the shaft, and cause the tooth 109 of the collar 103 to move rearwardly in channel 110, thereby causing it to slide on the shaft 8 to the right, causing arm 112 to swing to the right. The arm 116 would be caused to swing upwardly, and pull the rod 96 upwardly, transmitting this motion through the spring 94 of the piston 93 and the rod 91, to valve 89, thus closing port 88. The supply of gas would thereby be cut off, resulting in the slackening of the speed of the shaft 8 and the collar 103 keyed thereon would cause a slackening of the speed of the wheel through the pull exerted thereon by the coiled springs connecting the collar with the wheel. As long as the load remains constant, the wheel 100 revolves at the same speed as that of the shaft 8 being balanced by the coiled springs 104 and 105.

The speed of such an engine could also be regulated by hand when used on automobiles, railroad locomotives, or the like, by varying the supply of gas in the explosion chambers. As the gas in the explosion chambers is supplied through pipes leading out of a main 69, tapped on the reservoir 71 over the port 88, the supply would depend upon the speed with which the valve 89 is operated, the valve 89 being connected through the rod 91 with the piston 93 of the cylinder 92. Assuming therefore the port 88 to be open, the gas from reservoir 71 would flow through port 88 in pipe 69 and through elbow 202 in cylinder 92. The gas in cylinder 92 would cause a pressure on its piston 93 and cause it to move up, and compress spring 94 connecting the piston with the rod 96. After an explosion some of the gas in pipe 69 would be used up, causing a decrease in pressure and the spring would then cause the piston to move down, which would result in the opening of the port 88. The supply of gas would thus depend upon the tension of the spring 96. As the tension of the spring depends whether the coils are compressed or expanded, a wide range of speed may be obtained by turning the hand-wheel 99 which is provided with a worm 98 to mesh with the worm 97 of thread 96.

When the hand-wheel 99 is turned downwardly so as to increase the length of the rod 96, the spring 94 would become compressed which would necessitate a greater pressure in the cylinder to force the piston to move up to cause the valve 89 to close the port 88, allowing more gas to flow, for increasing the speed. When the hand-wheel 100 is turned in the opposite direction so as to shorten the rod the spring would expand and a lesser amount of pressure would be sufficient to force the piston up which would have the further effect of cutting off the supply of gas quicker, resulting in the engine running at a lower speed.

To prevent the reservoir pressure from becoming abnormal a safety valve 225 is mounted on a pin 226 pivoted in the pipe 201'. On pin 226 is mounted a lever 227 for holding a weight 229. The weight would keep the valve closed to prevent the gas from the reservoir from flowing through the pipe 201', except when the pressure became very high, when it would overcome the action of the weight and open the valve. Pipe 201 is tapped on a pipe 228 leading into reservoir 70. Pipe 228 is provided with a nipple 230 for connecting a hand pump for pumping gas in the reservoir when a new engine is to be started or when an engine is emptied for repairs, or when the reservoir becomes emptied for any other reason. The nipple is controlled by a valve 231 for closing it and with a valve 232 which would permit gas from the pipe to flow within the reservoir but would prevent the flow of gas from the reservoir into the pipes.

Having thus described this invention, what I claim as new and desire to protect by Letters Patent, is:—

1. A rotary engine consisting of a frame provided with pedestal webs extending therefrom and journal boxes formed therein, a shaft revolubly mounted in the boxes, a rotor mounted on the shaft, boxes extended from the frame, shoes spanning the rotor, and slidingly supported by the boxes, chambers having ports provided by the boxes, pipes leading into the chambers and over the ports, valves for closing and opening the ports, cylinders under the chambers, ports connecting the cylinders with the chambers, valves for closing and opening the ports, shoe-pistons slidingly mounted in the cylinders and provided with discharge orifices and with auxiliary orifices, slide channels formed in the shoes, slides mounted therein, and exhausts provided by the shoes.

2. A rotary engine consisting of a frame provided with pedestals and webs, journal boxes formed in the pedestals, a shaft journaled in the boxes, a rotor fixedly mounted on the shaft, a box extending from the frame mounted over the piston and provided with cylinders, a shoe spanning the rotor movably mounted between the box and the rotor and provided with pistons for the cylinders, gas chambers within the box and over the pistons, ports connecting the chambers with the cylinders, orifices through the pistons and under the ports, pipes leading into the chambers, ports connecting the chambers with the pipes, valves controlling the ports, valve controlled auxiliary orifices through the pistons, exhausts, and slide channels provided by the shoe, and slides mounted in the slide channels.

3. A rotary engine consisting of a frame provided with pedestals and webs, journal boxes formed in the pedestals, a shaft journaled therein, a rotor mounted thereon, a box joining the webs, two cylinders formed in the box, a shoe provided with pistons for the cylinders, a chamber within the box and over one of the cylinders, a pipe leading into the chamber, a port connecting the chamber with the cylinder, a port connecting the chamber with the pipe, valves controlling the ports, a discharge orifice through the piston mounted in the cylinder under the chamber, an auxiliary orifice through the piston of the other cylinder, a slide channel through the shoe ahead of the piston provided with the discharge orifice, and an exhaust through the shoe to the rear of the piston provided with the auxiliary orifice.

4. A rotary engine consisting of a frame, pedestals and webs, journal boxes provided by the pedestals, a shaft journaled therein, a grooved rotor fixedly mounted thereon, a box provided by the frame joining the webs, a shoe slidingly mounted between the rotor and the box, a chamber within the box, a pipe connecting with the chamber, a port between the chamber and the pipe, a slidingly mounted valve for controlling the port, a cylinder under the chamber, a port between the chamber and the cylinder, a shoe provided with a piston slidingly mounted in the cylinder, a discharge orifice through the piston between the cylinder and the rotor groove, a box cylinder, a shoe piston slidingly mounted therein and an orifice connecting the cylinder with the rotor groove, a slide channel in front of the discharge orificed piston, a slide guidingly mounted therein and an exhaust to the rear of the auxiliary orificed piston.

5. A rotary engine consisting of a frame, pedestals provided thereby, webs extending therefrom, journal boxes formed in the pedestals, a shaft journaled therein, a grooved rotor fixedly mounted thereon, a vane mounted in the groove, a box provided by the frame, a slidingly mounted shoe spanning the grooved rotor and under the box, a gas chamber within the box, a pipe tapped on the box and over the chamber, a port between the chamber and the pipe and a valve for controlling the port, a box cylinder under the chamber, a port between the chamber and the cylinder, a shoe piston slidingly mounted in the cylinder, a discharge orifice connecting the cylinder with the rotor groove, a box cylinder, a shoe piston slidingly mounted therein and an auxiliary orifice between the cylinder and the groove, a slide channel through the shoe along a radius through the center of the rotor, a slide guidingly mounted therein, and an exhaust through the shoe.

6. A rotary engine consisting of a frame comprising pedestals, webs and journal boxes formed in the pedestals, a shaft journaled in the boxes, a rotor fixedly mounted thereon, a conical groove around the periphery of the rotor, a radial vane fixedly mounted in the groove, a shoe spanning the rotor over the groove and provided with a radial channel and with an exhaust, a radial slide guidingly mounted in the channel, shoe pistons, provided by the shoe between the slide channel and the exhaust orifices through the pistons, a box provided with cylinders for the pistons and with explosion chambers over the cylinders, ports between the chambers and the cylinders, valves for controlling the ports, pipes leading to the chambers, ports between the chambers and the pipes, and valves for controlling the ports.

7. A rotary engine comprising a frame having pedestals provided with journal boxes, a shaft journaled therein, a frame box, a slidingly mounted shoe and a rotor consisting of cylindrical disks, a concentric cylinder of lesser diameter than those of the disks joining them to form a groove, radial vanes fixedly mounted on the rotor, and cams concentrically mounted on the disks and immediately below the groove.

8. A rotary engine comprising a frame, consisting of pedestals provided with journal boxes, a shaft journaled therein, a rotor provided with concentric cams mounted around the rotor, a box projecting from the frame, a shoe slidingly mounted between the box and the rotor and provided with a channel for a slide consisting of a top projecting upwardly above the shoe, arms horizontally projecting from the top, rods suspended from the arms and provided with sockets, bolts passing through the sockets, collars mounted on the bolts, and coiled springs joining the sockets with the journal boxes.

9. A rotary engine comprising a frame consisting of pedestals provided with journal boxes, a shaft journaled therein, a rotor fixedly mounted thereon, a box extending from the frame, a bracket attached to the box, a lever provided with a leg and with arms at right angles to the leg pivoted on the bracket, a rod pivoted on the leg, a shoe provided with a slide channel slidingly mounted between the box and the rotor, a slide passing through said channel and provided with a top pivotally connected with the leg of the pivoted arm.

10. A rotary engine comprising a frame consisting of pedestals, provided with journal boxes, a shaft journaled therein, a rotor mounted thereon, boxes extending from the frame, chambers within the boxes, cylinders under the chambers, pipes leading to the chambers, ports between the chambers and cylinders, ports between the chambers and pipes, valves for controlling the ports and mounted on rods, brackets attached to the boxes, levers vertically pivoted thereon and provided with a leg and with two arms at right angles to the leg for pivoting the valve rods, shoes provided with pistons slidingly mounted in the box cylinders and with slide channels, slides passing through the channels and rods for pivotally connecting the slides with the lever legs.

11. A rotary engine comprising a frame consisting of pedestals provided with journal boxes, a shaft journaled therein, a grooved rotor mounted thereon, vanes mounted in the groove, cams mounted on the rotor, a shoe spanning the rotor and mounted over its groove, a slide channel through the shoe, a piston provided with a discharge orifice and a piston provided with an auxiliary orifice extending above the shoe, an exhaust passing through the shoe, a box provided with cylinders for the shoe pistons fixedly extending from the frame and over the shoe, a chamber within the box and over the cylinder for the discharge oriﬁced piston, a pipe leading to the chamber, a port between the chamber, and the cylinder, a port between the chamber and the pipe, valves for controlling the ports, a bracket attached to the box, a lever consisting of a leg and of two arms at right angles to the leg pivoted on the bracket, rods pivoted on the leg, a slide mounted in the slide channel of the shoe and provided with a vane for the groove of the rotor and pivoted on the rod pivoted on the lever leg, arms extending from the slide, rods provided with sockets supported from the arms, and coiled springs connecting the rods with the journal boxes.

12. In a rotary engine a frame comprising a base, pedestals supported on the base, journal boxes formed in the pedestals, a shaft journaled therein, an eccentric fixedly mounted on the shaft, a ring encircling the eccentric, a piston and a rod connecting it with the eccentric ring, a cylinder for said piston, a pipe provided with a valve tapped on said cylinder, a reservoir connected by a port with said cylinder, a spring actuated valve controlling said port, a pipe leading out of the reservoir, a port connecting the reservoir with the pipe, a valve controlling the port, a cylinder mounted on the reservoir, an elbow pipe connecting the reservoir pipe with the cylinder, a piston mounted in said cylinder, a rod connecting the said piston with the port valve, a rod and a disk slidingly mounted thereon, a coiled spring connecting the piston with the disk, a box provided with a chamber, a pipe connecting the chamber with the reservoir pipe, a port between the chamber and said pipe, a valve for controlling the port, a cylinder under the chamber, a port between the chamber and the cylinder, a valve controlling the port, a bracket and a lever provided with arms and with a leg at right angles to said arms pivoted on the bracket, rods pivotally connecting the chamber valves with the lever arms, a grooved rotor fixedly mounted on the shaft, a shoe provided with a piston slidingly mounted in the box cylinder, a discharge orifice through the piston for connecting the box chamber with the rotor groove, a slide channel, a slide passing through said channel and provided with a vane for the piston groove, a rod for pivoting the slide on the lever leg, slide arms, rods suspended from the arms and springs connecting the arms with the journal boxes, one or more vanes fixedly mounted in the groove of the rotor, cams mounted on the rotor exterior to the groove and below the vanes, a box cylinder, a shoe piston for the cylinder and an auxiliary orifice through said piston connecting the cylinder with the rotor groove, and an exhaust passing through the shoe.

13. In a rotary engine a frame provided with pedestals having journal boxes, a shaft journaled in the boxes, a grooved rotor fixedly mounted on the shaft to revolve therewith, a box projecting from the frame, a shoe slidingly mounted under the box and spanning the rotor over its groove, a chamber within the box, a pipe leading to the chamber, a valve controlled port connecting the pipe with the chamber, a cylinder under the chamber, a valve controlled port connecting the chamber with the cylinder, a shoe piston slidingly mounted in the cylinder, a discharge orifice through the piston connecting the cylinder with the rotor groove, a vane fixedly mounted in the groove, a vane extending from a slide and a spring for causing the slide vane to fit in the piston groove, a cam mounted on the rotor, to cause the slide vane to move out of the groove to allow the rotor vane to pass the slide vane.

14. A rotary engine comprising a frame, pedestals supported by the frame and provided with journal boxes, a shaft journaled therein, a grooved rotor fixedly mounted thereon, a shoe slidingly mounted over the rotor, a vane fixedly mounted in the rotor groove, a slide provided with a vane slidingly mounted in the shoe, a spring for causing the slide vane to fit within the rotor groove to serve as a stationary backing for the fixedly mounted vane when it is past the slide vane, a box extending from the frame and over the shoe, a chamber within the box, a pipe leading to the chamber, a valve controlled port connecting the pipe with the chamber, a cylinder under the chamber, a valve controlled port between the cylinder and the chamber, a bracket mounted on the box, a lever provided with two arms and with a leg pivoted on the bracket, a rod pivoted on one of the arms for operating the pipe port valve, a rod pivoted on the other arm for operating the cylinder port valve, a rod pivotally connecting the vane-slide with the lever leg, a spring for moving the slide vane in the rotor groove for rocking the lever to cause the cylinder port valve to close the cylinder port at the same time causing the pipe port valve to open its port, a cam to lift the slide vane out of the rotor groove to let the fixed vane pass for causing one valve to open the pipe port and the other valve to close the cylinder port.

15. A rotary engine consisting of a frame, pedestals provided with journal boxes, a shaft journaled therein, a grooved rotor fixedly mounted thereon, a vane fixedly mounted in the groove, a shoe slidingly mounted over the groove of the rotor and provided with pistons, a box extending from the frame and provided with cylinders for the shoe pistons, a chamber within the box and over one of the cylinders, a port connecting the chamber with the cylinder, a pipe leading to the chamber, a port connecting the chamber with the pipe, a pipe port valve and a cylinder port valve and a means for manipulating the valves for closing one of the ports and at the same time opening the other one.

16. In a rotary engine a frame, pedestals supported by the frame and provided with journal boxes, a shaft journaled therein, a rotor mounted thereon and provided with a groove consisting of a cylindrical bottom and of tapered walls, a vane fixedly mounted in the groove, a shoe spanning the groove and provided with pistons, a box provided with cylinders for the pistons, a chamber within the box and over one of the cylinders, a port connecting the chamber with the cylinder, a pipe leading to the chamber, a port connecting the chamber with the pipe, valves for closing either one of the ports when the other one is opened, a bracket mounted on the box, a lever pivoted thereon and provided with arms and with a leg, a slide provided with a vane, a spring for causing the slide vane to move in the rotor groove, a cam mounted on the rotor for causing the slide to move its vane out of the groove to allow the fixedly mounted vane to pass the slide vane, a means for opening the pipe port and for closing the cylinder port when the slide vane is out of the rotor groove, and to reverse the operation when the slide vane is in the rotor groove.

17. A rotary engine consisting of a frame supporting pedestals provided with journal boxes, a shaft journaled in the boxes, a grooved rotor fixedly mounted on the shaft to revolve therewith and provided with a vane fixedly mounted in the groove, a box extending from the frame, a chamber within the box, a pipe leading to the chamber, a port connecting the pipe with the chamber, a valve for closing and opening the port, a cylinder under the chamber, a port connecting the cylinder with the chamber, a valve for closing and opening the port, a shoe mounted under the box and over the rotor groove and provided with a channel for a slide, with a piston for the cylinder port connected with the chamber, with a piston for a closed cylinder and with an exhaust, a slide mounted in the slide channel and provided with a vane free to move in and out of the rotor groove, a cam mounted on the rotor to cause the slide vane to move out of the groove to permit the rotor vane to pass the slide vane and a spring for causing the slide vane to fit in the groove.

18. In a rotary engine a revoluble grooved rotor provided with a fixed vane, a shoe slidingly mounted over the rotor and spanning the groove provided with pistons, a box provided with cylinders for the shoe pistons to slide in, a gas chamber within the box and over one of the cylinders, a pipe for supplying gas to the chamber, a port for permitting the gas from the pipe to flow into the chamber, a port for permitting the gas from the chamber to flow into the cylinder, a discharge orifice through the piston of the cylinder under the chamber, a slide provided with a vane for the groove, a means for permitting the fixedly mounted vane to pass the slide vane, a valve for opening and closing the port between the chamber and the pipe, a valve for closing and opening the port between the chamber and the cylinder, a means for manipulating the valves for filling the chamber with gas and for conveying the gas within the rotor groove when the fixedly mounted vane is past the discharge orifice and when the slide vane is in the rotor groove.

19. In a rotary engine, a grooved rotor provided with a fixedly mounted vane in the groove to revolve with the rotor, a non-revoluble shoe provided with pistons slidingly mounted over the rotor groove and spanning the rotor, a shoe provided with a slide channel, a slide provided with a vane for the groove slidingly mounted in the slide channel, a box mounted over the shoe and provided with cylinders for the shoe pistons, a chamber over one of the cylinders, and a discharge orifice through the piston of said cylinder, an auxiliary orifice through the piston of the other cylinder, a port for conveying gas from the pipe into the chamber, a port for conveying gas from the chamber into the cylinder and through the piston orifice into the rotor groove when the fixedly mounted vane is past said orifice, valves controlling the ports, a means for manipulating the valves for filling the chamber with gas when the fixedly mounted vane is past said orifice for causing said vane to move past the auxiliary orifice, and an exhaust through the shoe connecting the groove with the atmosphere for exhausting the gas from the groove when the fixedly mounted vane is past said exhaust.

20. In a rotary engine, a grooved rotor provided with a fixedly mounted vane in the groove to revolve with the rotor, a non-revoluble slidingly mounted shoe over the groove and spanning the rotor carrying pistons, a box over the shoe provided with cylinders for the shoe pistons, a gas chamber provided with ports controlled by valves for filling the chamber with gas and for conveying the gas from the chamber, a discharge orifice through one of the shoe pistons for conveying the gas into the rotor groove, a slide provided with a vane to be within the groove when the fixedly mounted vane is past the discharge orifice for holding the gas in the cylinder above the piston, in the discharge orifice and in the groove, an auxiliary orifice through the other shoe piston to convey gas from the groove into the cylinder over the piston when the fixedly mounted vane is past said auxiliary orifice to cause a gas tight contact between the groove, the shoe and the vanes while the fixedly mounted vane is being swept past the shoe, and an exhaust for exhausting the gas when the fixedly mounted vane passes from under the shoe.

21. In a rotary engine, a grooved rotor, a slidingly mounted shoe over the groove spanning the rotor and provided with a slide channel, with an exhaust and with pistons between the slide channel and the exhaust, a slide mounted in the slide channel and provided with a vane for movably fitting the rotor groove, and vanes fixedly mounted on the rotor.

22. In a rotary engine, a rotor provided with a groove around its cylindrical surface, slidingly mounted shoes spanning the rotor over the groove and provided with slide channels, with exhausts and with pistons between the channels, vanes fixedly mounted on the rotor and at such intervals apart, that when one of the vanes is past an exhaust of one shoe another vane is between the pistons of another shoe.

23. In an engine, a frame, pedestals provided by the frame, journal boxes formed in the pedestals, a shaft journaled in said boxes, a grooved rotor mounted on the shaft, slidingly mounted shoes spanning the piston and over the groove, boxes extending from the frame mounted over the shoes, gas chambers within the boxes, pipes leading into the chambers, a gas reservoir and a pipe connecting the reservoir with the chamber pipes, a port between the reservoir and the pipe, a valve for closing and opening the port, a cylinder mounted over the reservoir, an elbow pipe connecting the reservoir pipe with the cylinder, a piston mounted in the cylinder, a rod connecting the piston with the port valve, a rod, a disk slidingly mounted thereon, and a coiled spring connecting the disk with the piston.

24. In combination with an engine consisting of a rotor, boxes provided with gas chambers and with cylinders, shoes provided with orificed pistons for the box cylinders, pipes leading to the box chambers, a reservoir and a pipe connecting the reservoir with the chamber pipes, a valve controlled port between the reservoir and the pipe, a cylinder mounted on the reservoir, an elbow pipe connecting the reservoir pipe with the cylinder, a piston mounted in the cylinder, a rod connecting the port valve with the piston, a rod, a disk slidingly mounted thereon, a coiled spring connecting the disk with the piston for forcing the piston down the cylinder for causing the piston rod to actuate the valve for opening the port to allow gas from the reservoir into the pipe and through the elbow pipe into the cylinder to generate a pressure for forcing the piston up to close the port valve, a speed varying device consisting of an outer worm on the disk rod, and a hand wheel provided with an inner worm meshing with the rod worm for varying the tension of the spring.

25. In an engine, the combination of a frame, pedestals supported thereby and provided with journal boxes, a shaft having a rotor fixedly mounted thereon journaled in the boxes, a box provided with gas chambers and with cylinders, a shoe provided with pistons slidingly mounted in the box cylinders and provided with a slide channel, a slide slidingly mounted therein provided with two arms, rods attached to the arms and provided with noses, brackets attached to the frame and provided with guides for the rods, and lips under the noses for moving the rods outwardly, of a starting device consisting of a lever mounted on a pin pivoted on the frame, a rod pivoted on the lever and pivotally connected with levers pivoted on the frame and provided with pins for pivoting the lips and for pivotally supporting said lips for pressing the noses of the rods to cause the rods to move outwardly and for allowing the lips to slip from under the noses, and spring steel strips attached to the lip levers for causing the lips to assume a position on a line with said levers.

26. In an engine, the combination of a frame, pedestals supported thereby and provided with journal boxes, a shaft provided with a fixedly mounted rotor journaled in the boxes, a shoe spanning the rotor and provided with pistons, a box extending from the frame and provided with cylinders for the shoe pistons, a lug provided with notches mounted on the frame, a lever pivoted on the frame, a handle pivoted on the lever, a spring connecting it with the lever, and a plunger suspended from the handle over said notches.

27. In combination with an engine comprising a stationary part, a slidingly mounted and a rotating part, a starting and stopping device for the rotating part and consisting of a lever mounted on a pin pivoted on the stationary part and provided with arms, rods pivoted on the arms, levers pivoted on the stationary part and pivotally connected with the rods pivoted on the lever and provided with pins and with a spring, a lip pivoted on one of the pins and under the spring and provided with a recess for rocking about the other pin.

28. In an engine consisting of a frame, pedestals, journal boxes, and a shaft, a rotor mounted on the shaft, a box extending from the frame, a shoe slidingly mounted between the box and the rotor and provided with a slide channel, a slide slidingly mounted in said channel and provided with a vane and with arms, rods mounted on the arms, a lever pivoted on the frame and provided with pins, lips pivoted on one of the pins and having a recess rockingly supported under the other pin, an operating lever mounted on a pin pivoted on the frame, rods pivotally connecting the levers, a handle pivoted on the operating lever and a spring connecting the handle with the lever, a plunger suspended from the handle and free to engage the notches of a lug mounted on the frame.

29. In a rotary engine, a frame, pedestals supported thereby, and provided with journal boxes, a shaft journaled therein, a bevel gear mounted on the shaft, a bracket attached to the frame, and provided with a bearing, a spindle mounted therein, a bevel gear fixedly mounted on the spindle and meshing with the shaft gear, a collar provided with a groove slidingly mounted on the spindle, a ball governor supported by the spindle and over the collar, a bracket mounted on the frame, a lever pivoted on the bracket and provided with two arms one of which is rockingly supported in the collar groove, a frame socket, a plunger passing through the socket and in front of the other lever arm, a disk within the socket fixedly mounted on the plunger and a spring in the socket and over the plunger.

30. In a rotary engine, a frame, pedestals supported thereby, and provided with journal boxes, a shaft journaled therein, a rotor fixedly mounted thereon, boxes extending from the frame, shoes slidingly mounted between the boxes and the rotor and provided with slide channels, slides mounted in said channels and provided with vanes, arms projecting from said slides, rods suspended from the arms, noses mounted on the rods, sockets provided by the frame, plungers passing through the sockets and in front of the noses, springs within the sockets and over the plungers, brackets attached to the frame, levers pivoted on the brackets, a bracket provided with a bearing and attached to the frame, a spindle rotatably supported by the bearing, a gear fixedly mounted on the shaft, a gear fixedly mounted on the spindle and meshing with the shaft gear, a collar slidingly mounted on the spindle and provided with a groove for revolvingly supporting the arms of the levers pivoted on the frame brackets.

31. In an engine, a frame, pedestals supported thereby and provided with journal boxes, a shaft journaled therein, a rotor fixedly mounted thereon and consisting of disks joined by a concentric cylinder of a lesser diameter than those of the disks forming a cylindrical bottom of a groove whose walls are formed by the portions of the disks surrounding the cylinder which portions are tapered to form obtuse angles with the cylinder and with their cylindrical surfaces, one or more vanes radially mounted in the groove, a shoe provided with pistons slidingly mounted over the groove, a box extending from the frame and provided with cylinders for the shoe pistons, chambers within the box and over the cylinders, pipes leading to the chambers, a reservoir and a pipe connecting the reservoir with the chamber pipes, a cylinder mounted on the reservoir, an elbow joining the reservoir pipe with the cylinder, a piston mounted in the cylinder, a rod, a disk mounted thereon and a coiled spring joining the piston with the disk, an eccentric fixedly mounted on the shaft and rotatingly mounted in a cylindrical ring, a piston and a rod reciprocatingly joining the piston with the ring, a cylinder for the piston and mounted over the reservoir and a supply pipe leading into the cylinder.

32. In a gas engine, a carbureter, an air and gas pipe leading therein, a cylinder and a pipe joining the cylinder with the carbureter, a piston mounted in the cylinder, a shaft, a ring and an eccentric fixedly mounted on the shaft and revolubly mounted in the ring, a rod reciprocatingly joining the ring with the piston, a reservoir, a port joining the cylinder with the reservoir, a pipe leading out of the reservoir, a port between the reservoir and the pipe, a pipe connecting the reservoir pipe with the cylinder, a piston mounted in the cylinder, a rod, a disk mounted thereon and a spring connecting the piston with the disk, a box, chambers within the box, pipes connecting the chamber with the reservoir pipe, box cylinders under the chambers, a shoe provided with pistons for the cylinders and with exhausts, slide channels between the exhausts and the pistons, a rotor, a groove around the rotor, and vanes fixedly mounted in the groove.

33. In a gas engine, a frame, pedestals supported thereby and provided with journal boxes, and a shaft journaled therein, a carbureter for forming an explosive mixture from air and gas supplied thereto, a cylinder and a pipe provided with a valve connecting the carbureter with the cylinder for conducting the mixture from the carbureter into the cylinder and for preventing the return of the mixture into the carbureter, a reservoir and a port connecting the reservoir with the cylinder, a piston slidingly mounted in the cylinder, a means to cause the piston to slide up for causing the mixture to flow from the carbureter into the cylinder, and to cause the piston to slide down for causing the mixture to flow from the cylinder into the reservoir through the connecting port, a valve provided with a spring for closing the port on the up stroke of the piston to cause the storing of the mixture in the reservoir, a pipe leading out of the reservoir, a port to allow the mixture in the reservoir to flow in the pipe, a cylinder mounted on the reservoir, boxes extending from the frame and provided with gas chambers, a pipe connecting the reservoir pipe with the cylinder and pipes connecting it with the box chambers for conducting the mixture from the reservoir into the cylinder and into the chambers, a piston slidingly mounted in the cylinder, a rod, a disk mounted thereon, a spring connecting the piston with the disk for causing the piston to move down in the cylinder, a valve within the reservoir for closing and opening the port between the reservoir and the pipe, a rod joining the piston with the valve for causing the valve to open the port when the piston is down in the cylinder to allow the mixture to flow from the reservoir into the pipe and into the cylinder, said gas to force the piston up to cause the valve to close the port, cylinders under the chambers, a shoe provided with pistons slidingly mounted in the cylinders, and a rotor fixedly mounted on the shaft.

34. In a gas engine comprising a frame, pedestals supported thereby and provided with journal boxes and a shaft journaled therein, a carbureter for generating an explosive mixture, a reservoir and a pump for forcing the mixture from the carbureter into the reservoir, a pipe leading from the reservoir, a port between the reservoir and the pipe, a valve for closing and opening the port, a means for operating the valve to open the port for causing the mixture to flow from the reservoir into the pipe and into the valve operating means, and for preventing the mixture from flowing out of the reservoir, a box extending from the frame, a chamber within the box, a cylinder under the chamber and a pipe connecting the chamber with the reservoir pipe, a port between the chamber and the pipe, a port between the chamber and the cylinder, valves for controlling said ports, and a means for opening the pipe port and for closing the cylinder port to allow the mixture to flow from the reservoir pipe through the chamber pipe and into the chamber, a shoe provided with a piston slidingly mounted in the box cylinder, an orifice through the piston and under the cylinder port, a rotor provided with a groove fixedly mounted on the shaft to revolve therewith, a vane fixedly mounted on the rotor, a slide channel through the shoe and a slide provided with a vane passing through the shoe to project within the groove when the fixedly mounted vane is past the shoe piston to form an impact chamber, a means for closing the pipe port and for opening the cylinder port to allow the mixture to flow from the chamber in the cylinder, over the piston, through the orifice and into the impact chamber.

35. In a gas engine, a frame, pedestals supported thereby and provided with journal boxes, a shaft journaled therein, a reservoir, main explosive mixture generating means, a means operated from the shaft for forcing the mixture from the generating means into the reservoir, a pipe for conveying the mixture from the reservoir, a valve controlled port between the reservoir and the pipe, a cylinder and a piston slidingly mounted therein, a spring for producing a down stroke on the piston for opening the port valve, to allow the mixture to flow from the reservoir in the pipe, a pipe connecting the reservoir pipe with the cylinder for conveying part of the mixture from the pipe to force the piston up for closing the port valve, a box extending from the frame and provided with a chamber, a pipe for conveying the mixture from the reservoir into the chamber, a cylinder under the chamber, a shoe provided with an orificed piston for the cylinder, a revoluble grooved rotor under the shoe, a fixedly mounted vane in the groove, a slide provided with a vane reaching in the groove when the fixedly mounted vane is past the orificed piston, a sparking space in the chamber, ports connecting the chamber with the pipe and with the cylinder and means for closing the pipe port and for opening the cylinder port and for causing a spark in the sparking space for igniting the mixture and generating a high pressure for forcing the products of combustion from the chamber into the cylinder through the piston orifice and into the space of the groove between the fixedly mounted vane and the slide vane.

36. In an engine comprising a frame, pedestals supported thereby and provided with journal boxes, a shaft journaled therein, a gas generator, a reservoir for storing the gas, a reciprocating pump for forcing the gas from the generator into the reservoir, a means for transmitting the motion of the shaft to the pump, a pipe leading out of the reservoir, a cylinder, a piston slidingly mounted therein and a pipe connecting the reservoir with the cylinder to convey gas from the reservoir into the cylinder to force the piston up for preventing the flow of gas from the reservoir, a ring forcing the piston down to permit the flow of gas from the reservoir, a box projecting from the frame, a chamber within the box and a pipe connecting the reservoir pipe with the chamber, a cylinder under the chamber, ports between the chamber and the cylinder and between the chamber and the pipe, valves and means for manipulating the valves for closing the cylinder port and for opening the pipe port to permit the gas to accumulate in the chamber and to close the pipe port and open the cylinder port to permit the accumulated gas to flow from the cylinder, a shoe provided with an orificed piston for the cylinder, a grooved rotor fixedly mounted on the shaft, a vane fixedly mounted in the groove, a slide provided with a vane and a means for holding the vane on the rotor when the fixedly mounted vane is past the orificed piston for permitting the gas of the chamber to flow in the groove and for confining the gas therein between the vanes, an electric circuit provided with terminals in the box chamber, an arcing space between the terminals and a means to cause a spark for exploding the gas in the chamber to force it through the orifice for producing a pressure on the fixedly mounted vane to cause the shaft to rotate.

37. In a rotary gas engine, comprising a frame, pedestals supported thereby and provided with journal boxes and a shaft journaled therein, a rotor fixedly mounted thereon to revolve therewith and consisting of two disks, a concentric cylinder of lesser diameter than those of the disks joining them and forming the bottom of a groove flanged by the disks which are tapered to form an obtuse angled joint with the cylinder, a shoe provided with pistons slidingly mounted over the groove, vanes fixedly mounted on the rotor, a slide slidingly mounted in the shoe and provided with a vane for fittingly projecting in the groove, a box supported from the frame and provided with cylinders for the pistons, a gas chamber within the box, means for causing gas to accumulate in the chamber, means for forcing gas from the chamber into the cylinders and over the pistons for causing gas tight contact between the shoe and the rotor groove.

38. In a rotary engine comprising a frame, pedestals supported thereby, and provided with journal boxes, a shaft revolvingly mounted therein, a grooved rotor fixedly mounted thereon to revolve therewith, vanes fixedly mounted on the rotor, cams mounted on the rotor on the outside of and below the groove, a shoe provided with a slide channel, slidingly mounted over the rotor, a slide provided with a vane for projecting within the groove slidingly mounted in the channel to be lifted out of the groove by the cams for allowing the fixedly mounted vane to pass the slide vane, and coiled springs connecting the slide with the journal boxes for causing the slide vane to project in the groove when the fixedly mounted vane is past the slide vane.

39. In a rotary gas engine comprising a frame, pedestals supported thereby provided with journal boxes and a shaft journaled therein, a rotor fixedly mounted on the shaft to revolve therewith, a groove around the rotor, vanes fixedly mounted on the rotor, cams mounted on the rotor on the outside of the groove and below the vanes, a shoe pivoted with pistons slidingly mounted over the groove and spanning the rotor, a box projecting from the frame and provided with cylinders for the shoe pistons, a gas chamber in the box, terminals of an electric circuit in the chamber orifices through the shoe pistons, a slide channel through the shoe and a slide provided with a vane slidingly supported therein for permitting the vane to slide in and out of the rotor groove, a means for causing the slide vane to project in the groove when a fixedly mounted vane is past an orifice of a shoe piston, a means for conveying an explosive mixture into the box chamber, a means for closing the conveying means and for exploding the mixture for forcing it into the groove to produce a pressure on the fixedly mounted vane when said vane is past the shoe piston for causing the journaled shaft to rotate, an exhaust through the shoe for discharging the gas from the groove when the fixedly mounted vane is passing said exhaust.

40. In a gas engine comprising a frame, pedestals supported thereby and provided with journal boxes, a shaft journaled therein, a grooved rotor fixedly mounted thereon, shoes provided with pistons mounted over the rotor groove and spanning the rotor, and a box projecting from the frame provided with cylinders over the shoe pistons, a gas chamber within the box and over the cylinder, orifices through the pistons, a means for generating an explosive mixture, a reservoir for storing the mixture, a means for forcing the mixture from the generator into the reservoir, a pipe for conveying the mixture from the reservoir through a port controlled by a valve, a cylinder and a piston mounted therein, a rod connecting the piston with the reservoir pipe port valve and a spring for causing the piston to open the valve for permitting the mixture of the reservoir to flow in the pipe, an elbow pipe connecting the reservoir pipe with the cylinder for permitting the mixture to flow in the cylinder for causing the piston to close the valve, pipes connecting the reservoir pipe with the box chambers, ports between the chambers and the pipes and between the chambers and the cylinders, valves and a means for closing the cylinder ports and opening the pipe ports for allowing the mixture to accumulate in the chambers, terminals of an electric circuit within the chambers, an arcing space between the terminals for exploding the accumulated mixture, fixedly mounted vanes in the groove, a slide channel of the shoe in front of the shoe pistons and exhausts in the rear of the pistons, a slide mounted in the slide channel provided with a vane, springs connecting the slide with the journal boxes for forcing the slide vane into the groove to form a pressure chamber when one of the fixedly mounted vanes is past a shoe piston, a means for causing a spark in the arcing space for exploding the mixture to force it through the piston orifice and within the groove for producing a pressure on the said fixedly mounted vane to cause the shaft to revolve until said vane is past the exhaust and to bring another vane past the orifice of a piston, cams mounted on the rotor for causing the slide to move out of the rotor groove for permitting the fixedly mounted vane to pass to form another impact chamber for an exploded mixture for producing a pressure on said fixedly mounted vane.

41. In a rotary gas engine, a frame, pedestals supported thereby provided with journal boxes and a shaft journaled therein, a grooved rotor fixedly mounted on the shaft to revolve therewith, radial vanes fixedly mounted on the rotor, shoes provided with pistons spanning the rotor and slidingly mounted over the groove, exhausts through the shoes and slide channels passing radially through the shoes and between the exhausts and the pistons, slides mounted in the channels provided with vanes for movingly fitting the rotor groove, cams mounted on the rotor for lifting the slide vanes out of the groove to permit the fixedly mounted vanes to pass the slide vanes, springs connecting the slides with the journal boxes for causing the slide vanes to move into the groove, boxes projecting from the frame and provided with cylinders for the shoe pistons, chambers within the boxes and over the cylinders, pipes leading to the chambers, ports between the chambers and the pipes, ports between the chambers and the cylinders, orifices through the shoe pistons connecting the cylinders with the rotor groove terminals of an electric circuit within the chambers, an arcing space between the terminals, brackets attached to the boxes, levers provided with two arms and with a leg pivoted on the brackets, rods pivoted on the arms, valves for controlling the ports mounted on the rods, rods pivotally connecting the shoe slides with the legs of the levers, terminals of an electric circuit grounded on the frame and terminals near the levers for closing a circuit when the cylinder ports are closed and the pipe ports are open, and for breaking the circuit when the pipe ports are closed and the cylinder ports are open for exploding a gas in the chambers which is forced within the rotor groove to produce a pressure on the vanes fixedly mounted in the groove for causing the rotor to revolve with the shaft.

42. In a rotary engine comprising a frame, pedestals supported thereby and provided with journal boxes, a shaft journaled therein, a grooved rotor fixedly mounted thereon provided with fixedly mounted vanes to revolve therewith by a pressure produced on said vanes, shoes spanning the rotor provided with pistons, boxes provided with cylinders for said pistons, chambers within the boxes, orifices through the shoe pistons for conducting a gas from the chambers into the groove of the rotor, in combination with orifices for conducting gas from the groove to the cylinders over the pistons for causing the shoes to make gas tight contact with the span of the rotor.

43. In a rotary gas engine comprising a frame, pedestals supported thereby and provided with journal boxes, a shaft journaled therein, a rotor, a groove around the rotor and radial vanes mounted therein for receiving a pressure for causing the rotation of the shaft, shoes mounted over the groove spanning the rotor, pistons to be forced by a gas to cause gas tight contact between the shoes and the rotor span, channels, slides slidingly mounted therein and provided with vanes free to slide in and out of the rotor groove, boxes projecting from the frame and provided with cylinders, for the shoe pistons, gas chambers over the cylinders, gas pipes leading to the chambers, ports and valves for controlling them, terminals of electric circuits and means for causing sparks between said terminals, brackets mounted on the boxes, levers pivoted thereon and pivotally connected with the chamber port valves and with the slides and near a terminal of an electric circuit, cams mounted on the rotor for lifting the slide vanes out of the groove to allow the fixedly mounted vanes to pass them and to cause the slides to operate the levers to close a cylinder port and to open a pipe port for allowing gas to accumulate in a chamber at the same time closing an electric circuit, springs connecting the slides with the journal boxes for causing the slide vanes to move down in the groove when a fixed vane is past a shoe piston, for the purpose of forming impact chambers to cause the slide to operate the lever for causing the pipe ports to close and the cylinder ports to open and at the same time breaking an electric circuit for causing a spark within the chamber, in combination with hand operated starting and stopping devices for lifting the slide vanes out to allow the accumulation of gas in the box chambers and closing an electric circuit and to hold it in this position for preventing explosions to make the engine inactive, and for releasing the slides to open a circuit for exploding the accumulated gas to produce a pressure on the rotor vanes for starting the engine.

44. In a rotary gas engine comprising a frame, pedestals supported thereby and provided with journal boxes, a shaft journaled therein, a grooved rotor mounted thereon to revolve therewith, a shoe provided with an orificed piston, exhausts and channels mounted over the groove and spanning the rotor, boxes provided with gas chambers and with cylinders for the pistons, means for filling the chambers with an explosive mixture, means for exploding the mixture for forcing the products of combustion into a pressure chamber consisting of a portion of the groove, the vane of the slide mounted in the slide channel of the shoe, a vane of the groove and the span of the shoe between the groove vane and the slide vane for causing an impact upon the groove vane for producing the rotation of the shaft.

45. In a rotary gas engine comprising a frame, pedestals supported thereby and provided with journal boxes, a shaft journaled therein, a grooved rotor mounted thereon to revolve therewith, radial vanes fixedly mounted in the groove to be impelled by pressure to cause the shaft to rotate, shoes mounted over the groove and provided with orificed pistons, radial slide channels and exhausts, slides provided with vanes slidingly mounted in the slide channels, boxes provided with gas chambers and with cylinders for the shoe pistons, means for conveying gas into the cylinders and over the pistons for causing them to force the shoes against the spans of the rotor for producing a gas tight contact between the shoes and the said spans, and expanding pressure chambers consisting of portions of the rotor groove, the slide vanes, the span of the shoe and the fixed vanes as they move past the pistons when the gas is exploded in the gas chambers and forced within the groove causing a pressure on the fixedly mounted vanes and forcing them to move past the pistons and the exhausts.

46. In a rotary gas engine comprising a frame, pedestals supported thereby and provided with journal boxes, a shaft journaled therein, a grooved rotor provided with radial vanes adapted to rotate with the shaft, shoes provided with orificed pistons, with exhausts and with radial slide channels between the exhausts and the pistons and over the rotor groove and span, the rotor always having one vane between a pair of shoe pistons when another passes an exhaust, boxes provided with cylinders for the pistons and with gas chambers over the cylinders, means for accumulating an explosive mixture within the chambers, means for exploding the mixture for forcing the products of combustion in a rotating pressure chamber consisting of a vane of a slide mounted in a radial shoe channel, a portion of the groove between a fixedly mounted vane and a slide vane and the span of the shoe to produce a pressure on the fixedly mounted vane to impel it away from the slide vane for causing the rotor shaft to revolve.

47. In a rotary engine comprising a frame, pedestals supported thereby and provided with journal boxes and a shaft journaled therein, a grooved rotor provided with fixedly mounted vanes to be impelled by a series of successive impacts for causing the shaft to rotate, a shoe spanning the rotor and mounted over the groove and provided with pistons for forcing the shoe to make gas tight contact with the span of the rotor, orifices for conveying an exploded mixture, an exhaust and a radial channel, a slide provided with a vane adapted to enter the groove and adapted to move in and out thereof, a box provided with cylinders for the pistons for causing gas to force the pistons to press the shoe against the span of the rotor for preventing leakage and with gas chambers, means for accumulating an explosive mixture in the chambers, means for forcing the mixture within an impact chamber of a portion of the groove included between a slide vane and a rotor vane past a shoe piston ahead of the slide vane and the span of the shoe for producing a pressure upon the rotor vane to impel it past the shoe exhaust, and to bring another rotor vane in a similar position for being impelled for producing a continuous rotation of the rotor shaft.

48. In a rotary gas engine, comprising a frame, pedestals supported thereby and provided with journal boxes and a shaft journaled therein, a grooved rotor, radial vanes fixedly mounted on the rotor, boxes extending from the frame and provided with chambers, means for accumulating gas in the chambers, means for exploding the gas in the chambers, cylinders under the chambers, shoes provided with pistons slidingly mounted in the cylinders, orifices through the pistons, exhausts and radial slide channels, slides provided with vanes adapted to slide in and out of the rotor groove, an orifice through the piston for permitting the exploded mixture to be forced within the groove for causing a pressure on a fixedly mounted vane to force it past an exhaust, thereby bringing another vane in a position to be actuated by a pressure for producing a continuous rotation of the journaled shaft in combination with a hand operated starting and stopping device to prevent the explosion of the accumulated gas for stopping the engine and to cause the gas to explode for starting the engine.

49. In a rotary engine, comprising a frame, pedestals supported thereby and provided with journal boxes and a shaft journaled therein, a rotor fixedly mounted thereon, shoes spanning the rotor boxes projecting from the frame over the shoes, chambers within the boxes, pipes connected with the chambers, a reservoir and a pipe connecting the reservoir with the chamber pipes, a gas generator and a pump operated from the shaft for filling the reservoir with gas from the gas generator, a valve controlled pipe connecting the generator with the pump, and a valve controlled pipe connecting the reservoir with the pump pipe, for allowing any surplus gas to escape from the reservoir into the pump pipe and for preventing the flow of gas in the reservoir through said connecting pipe.

50. In a rotary engine, comprising a frame, pedestals supported thereby and provided with journal boxes and a shaft journaled therein, a rotor fixedly mounted thereon, shoes spanning the rotor, boxes projecting from the frame over the shoes, chambers within the boxes, a reservoir, a pipe leading out of the reservoir pipes connecting it with the box chambers, a gas generator, a pump and a valve controlled pipe connecting the generator with the pump, said pump being operated from the shaft for keeping the reservoir filled with a gas supplied by the generator, a pipe connecting the reservoir with the pump pipe for conveying a surplus of gas from the reservoir, in combination with a means for filling the reservoir when it is empty and consisting of a pipe connecting the reservoir with the surplus gas pipe, a nipple for attaching a hand pump to pump gas from the generator to cause it to flow into the reservoir and a valve to prevent the gas from the reservoir from flowing out of the reservoir.

51. In a rotary gas engine comprising a frame, pedestals supported thereby and provided with journal boxes and a shaft journaled therein, a grooved rotor provided with fixed radial vanes, boxes extending from the frame, and provided with cylinders, shoes provided with orificed pistons for the cylinders and with exhausts and radial slide channels, slides in the said channels provided with vanes adapted to move in and out of the groove, means for causing gas to accumulate in the box chambers, means for exploding the gas, means for forcing the exploded gas in the groove between a fixedly mounted vane and a slide vane to produce a consecutive succession of impulses on fixedly mounted vanes for producing a continuous rotation of the journaled shaft and a hand operated starting and stopping device, in combination with a centrifugal governor to automatically prevent the explosion of the accumulated gas, when there is a tendency for the shaft to be impelled at a speed higher than the normal, and to cause an explosion when there is a tendency for the speed to drop below the normal.

52. In a rotary gas engine, comprising a frame, pedestals supported thereby and provided with journal boxes and a shaft journaled therein, a grooved rotor provided with radial vanes, shoes mounted over the groove and provided with pistons each of them having an orifice for conveying gas within the rotor groove and an orifice controlled by a valve for conveying gas from the groove when no gas is conveyed through the other orifice, a box extending from the frame and provided with cylinders for the pistons, two gas chambers, means for accumulating gas in the chambers, means for exploding the gas to produce impulses on vanes for causing a continuous rotation of the journaled shaft, in combination with starting and stopping and with governing devices in duplicate for causing explosions in one of the chambers of a box for causing the shaft to rotate in one direction, and for causing explosions in the other chamber of a box for reversing the direction.

53. In a rotary gas engine, comprising a frame, pedestals supported thereby, and provided with journal boxes and a shaft journaled therein, a grooved rotor fixedly mounted on the shaft to revolve therewith, radial disks fixedly mounted in the groove to be impelled by a succession of impulses for causing the rotor to revolve the shaft, shoes provided with pistons, with exhausts and with radial channels, slides slidingly mounted in said channels and provided with vanes for the rotor groove, boxes provided with cylinders for the shoe pistons and with gas chambers, a gas generator, a reservoir, a pump for forcing an explosive mixture from the generator into the reservoir, a reservoir pipe, a port between the reservoir and said pipe, pipes connecting the reservoir pipe with the box chambers to allow the accumulation of gas in the chambers, a means to explode the gas for forcing the products of combustion in the groove to produce a succession of impulses on vanes for causing a shaft to rotate, a cylinder, a pipe connecting the cylinder with the reservoir pipe, a piston, a rod connecting the piston with the port valve, a disk and a spring connecting the piston with the disk for forcing the piston down to open the port for causing gas to flow in the reservoir pipe and in the box chamber to be exploded there for causing a shaft to rotate, in combination with a hand operated speed regulating device consisting of a rod for slidingly mounting the spring disk thereon, a hand wheel over the rod and provided with an inner worm to mesh with an outer worm on the rod for increasing the tension of the spring for opening the port and holding it open for allowing a quantity of gas to flow in the explosion chambers for higher speeds and for decreasing the tension to attain lower speeds.

54. A rotary gas engine comprising a frame, pedestals supported thereby and provided with journal boxes and a shaft journaled therein, a grooved rotor provided with vanes mounted on the shaft, shoes provided with orificed pistons spanning the rotor, boxes provided with cylinders for the pistons and with gas chambers and extending from the frame, means for accumulating an explosive mixture in the chambers, means for exploding an explosive mixture for forcing it into the groove of the rotor for producing a succession of impulses on the vanes to cause a shaft to revolve, a reservoir for storing the explosive mixture, pipes for conveying the mixture to the explosion chambers, a cylinder, a piston slidingly mounted therein, a pipe for conveying gas into the cylinder for forcing the piston up, a rod, a disk mounted thereon and spring connected with the piston for forcing it down in the cylinder, in combination with a wheel for transmitting the motion from the shaft to drive a variable load of a torque governor for preventing any check on the wheel by an increased load to cause a checking of the speed of the shaft, and for preventing the wheel from causing the shaft to run at an increased speed when the load is decreasing, and consisting of a lever provided with an arm pivoted on the disk spring connected with the cylinder piston to vary the tension of the spring for a greater or a smaller quantity of gas to flow from the reservoir into the explosion chambers, a collar slidingly mounted on the shaft, and provided with a groove for rockingly supporting an arm of the lever pivoted on the bracket, and revolvingly mounted on the hub of the wheel, a groove around the hub, a tooth provided by the collar revolvingly engaging the hub groove and coiled springs connecting the collar with the wheel.

55. In combination with a shaft of a rotary engine made to rotate continuously by impulses produced on vanes radially mounted in a groove of a rotor carried by the shaft by exploding a mixture in a chamber of a box which is supplied by a gas reservoir provided with a port controlled by a valve actuated by a piston forced upwardly by gas from the reservoir for closing the port and downwardly by a spring connecting the piston with a disk mounted on a rod, a means driven by the shaft for carrying a variable load and a torque governor for causing the shaft to revolve at a constant speed under the said load and consisting of, a wheel revolubly mounted on the shaft and provided with a hub, a collar revolubly mounted on the hub and slidingly mounted on the shaft, a lever actuated by the collar to cause an up and down motion of the rod for carrying the tension of the spring to vary the amount of gas in the exploding chambers for varying the forces of the impulses on the vanes to vary the rotative power of the shaft.

In witness whereof I have hereunto attached my signature to this specification in the presence of two subscribing witnesses.

CHARLES W. MITCHELL.

Witnesses:
 JAMES G. DURHAM,
 WM. PORTNER.